(12) United States Patent
Hoelsæter

(10) Patent No.: US 9,024,996 B2
(45) Date of Patent: May 5, 2015

(54) PAN-TILT MECHANISM FOR A VIDEO CONFERENCING CAMERA

(71) Applicant: Cisco Technology, Inc., San Jose, CA (US)

(72) Inventor: Håvard Hoelsæter, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 13/925,909

(22) Filed: Jun. 25, 2013

(65) Prior Publication Data

US 2014/0375745 A1    Dec. 25, 2014

(51) Int. Cl.
| | |
|---|---|
| *H04N 7/15* | (2006.01) |
| *G03B 17/56* | (2006.01) |
| *F16M 11/10* | (2006.01) |
| *F16M 11/18* | (2006.01) |
| *F16M 11/20* | (2006.01) |

(52) U.S. Cl.
CPC .............. *G03B 17/561* (2013.01); *H04N 7/15* (2013.01); *F16M 11/10* (2013.01); *F16M 11/18* (2013.01); *F16M 11/2014* (2013.01)

(58) Field of Classification Search
CPC .............................. G03B 17/561; H04N 7/142
USPC ............... 248/183.3; 348/373, 143, 208.7; 396/325, 419, 427, 428
See application file for complete search history.

(56) References Cited

U.S. PATENT DOCUMENTS

| | | | | |
|---|---|---|---|---|
| 4,890,713 | A * | 1/1990 | Pagano ................... | 192/142 R |
| 4,955,568 | A * | 9/1990 | O'Connor et al. ......... | 248/183.3 |
| 5,850,579 | A * | 12/1998 | Melby et al. ............... | 396/427 |
| 6,027,257 | A | 2/2000 | Richards et al. | |
| 6,356,308 | B1 * | 3/2002 | Hovanky .................... | 348/373 |
| 6,752,541 | B1 * | 6/2004 | Dykyj ....................... | 396/428 |
| 7,046,295 | B2 * | 5/2006 | Hovanky .................... | 348/373 |
| 7,503,708 | B2 * | 3/2009 | Yang et al. ................ | 396/427 |
| 7,527,439 | B1 * | 5/2009 | Dumm ....................... | 396/419 |
| 8,199,197 | B2 * | 6/2012 | Bennett et al. ............. | 348/144 |
| 8,325,229 | B2 * | 12/2012 | Jones et al. ................ | 348/143 |
| 8,405,731 | B2 * | 3/2013 | Nilsson ..................... | 348/208.7 |
| 2003/0077082 | A1 * | 4/2003 | Ito ............................ | 396/428 |
| 2004/0184798 | A1 * | 9/2004 | Dumm ....................... | 396/428 |
| 2010/0193647 | A1 | 8/2010 | Huang et al. | |
| 2011/0249963 | A1 * | 10/2011 | Cramer et al. ............. | 396/325 |

OTHER PUBLICATIONS

International Search Report dated Nov. 17, 2014 cited in Application No. PCT/US2014/043878, 11 pgs.

* cited by examiner

*Primary Examiner* — Gerald Gauthier

(74) *Attorney, Agent, or Firm* — Merchant & Gould P.C.

(57) ABSTRACT

A pan-tilt mechanism for a video conferencing camera may be provided. The pan-tilt mechanism may comprise a base, a bracket, a tilt motor, and a pan motor. The tilt motor may be fixed to the base and may be configured to cause the bracket to tilt along a horizontal axis. The pan motor may be fixed to the base and may be configured to cause the bracket to pan about a vertical axis without affecting the tilt of the bracket.

20 Claims, 16 Drawing Sheets

PAN-TILT MECHANISM FOR A VIDEO CONFERENCING CAMERA

TECHNICAL FIELD

The present disclosure relates generally to videoconferencing.

BACKGROUND

Videoconferencing is a set of telecommunication technologies that allow two or more locations to communicate by simultaneous two-way video and audio transmissions. It has also been called 'visual collaboration' and is a type of groupware. Videoconferencing differs from videophone calls in that it's designed to serve a conference or multiple locations rather than individuals. Video cameras are sued in videoconferencing to provide the video transmissions.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
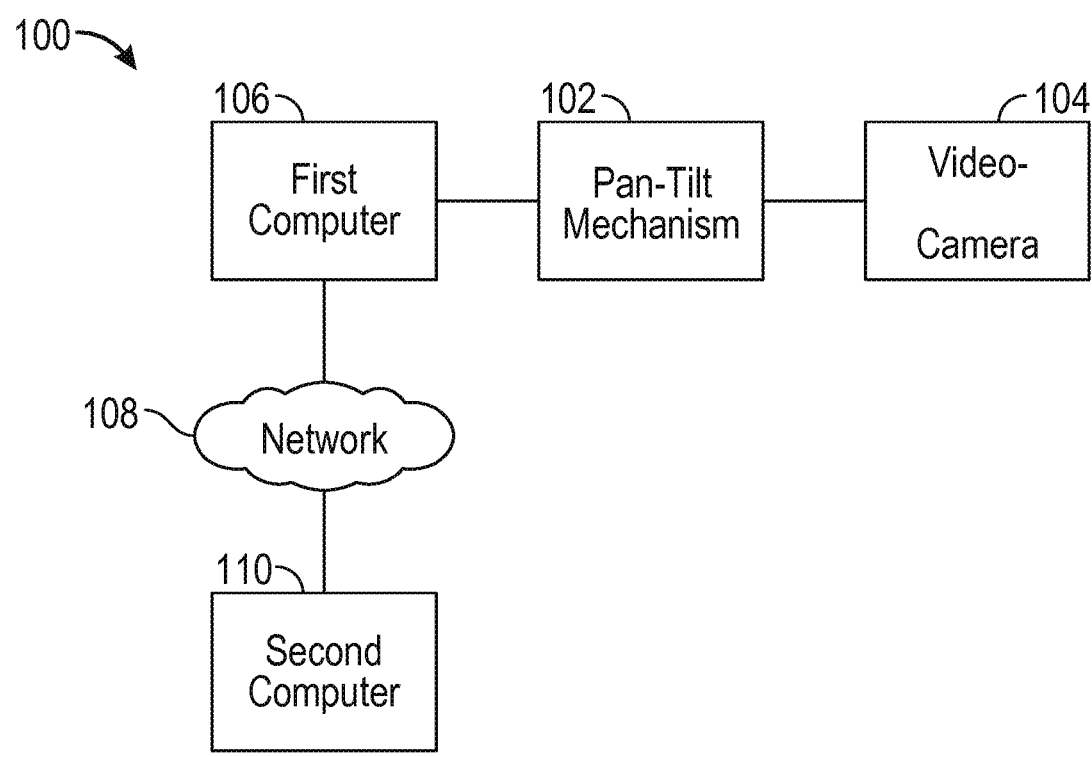
FIG. 1 shows an operating environment for a pan-tilt mechanism for a video conferencing camera.

A pan-tilt mechanism for a video conferencing camera may be provided. The pan-tilt mechanism may comprise a base, a bracket, a tilt motor, and a pan motor. The tilt motor may be fixed to the base and may be configured to cause the bracket to tilt along a horizontal axis. The pan motor may be fixed to the base and may be configured to cause the bracket to pan about a vertical axis without affecting the tilt of the bracket.

Both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Consistent with embodiments of the disclosure, a pan-tilt mechanism for a video conferencing camera may allow users to both pan and tilt a camera. Panning and tilting may allow for focusing on different things or people within a room during a video conference. Once a tilt angle is set, it may be desirable to pan without changing the tilt angle.

The pan-tilt mechanism may comprise at least two drive motors (e.g., a pan motor and a tilt motor) that may be actuated to pan and tilt the video conferencing camera. Both the pan motor and the tilt motor may be fixed relative to one another. Because the pan motor and the tilt motor may be fixed relative to one another, neither may move nor ride on any portion of the pan-tilt mechanism during operation. Consequently, electrical wires connected to the pan motor and the tilt motor may not be damaged due to flexing since neither the pan motor nor the tilt motor may move during operation of the pan-tilt mechanism. Moreover, neither the pan motor nor the tilt motor may have to be sized to move the weight of the other respective motor since neither may ride on any portion of the pan-tilt mechanism during operation.

The tilt motor may operate independently of the pan motor to control the tilt angle of the video conferencing camera. The tilt motor may be connected to the camera via a gearing system (e.g., a worm gear or a spur gear). During tilting operations, the gearing system may cause the tilt angle to change.

The pan motor may be connected to the camera via a body or other structure that may be connected directly to the video conferencing camera. As the video conferencing camera is panned by the pan motor, the gearing system that controls tilt may inadvertently cause an undesirable change in the tilt angle if the tilt motor is not actuated substantially simultaneously and in conjunction with the pan motor. To keep the tilt angle constant during panning, the tilt motor may need to actuate during a panning operation. In other words, the rotation of the gearing system may need to be synchronized with the rotation of the body during panning operations.

FIG. 1 shows an operating environment 100 for a pan-tilt mechanism 102 for a video conferencing camera 104. Video conferencing camera 104 may be attached to the pan-tilt mechanism 102 thus allowing video conferencing camera 104 to pan and tilt. Pan-tilt mechanism 102 may be connected to a first computer 106. First computer 106 may be used to control both video conferencing camera 104 and pan-tilt mechanism 102. For example, first computer 106 may be used to turn video conferencing camera 104 on and off. In addition, first computer 106 may be used to actuate pan-tilt mechanism 102 causing video conferencing camera 104 to pan, tilt, or both.

First computer 106 may be connected to a network 108 (e.g., the internet). The network connection may allow first computer to send images from video conferencing camera 104 to one or more computers. For example, first computer 106 may transmit images, via network 108 to a second computer 110. In addition, video conferencing camera 104 may be controlled by second computer 110 via network 108.

Figure 2A:
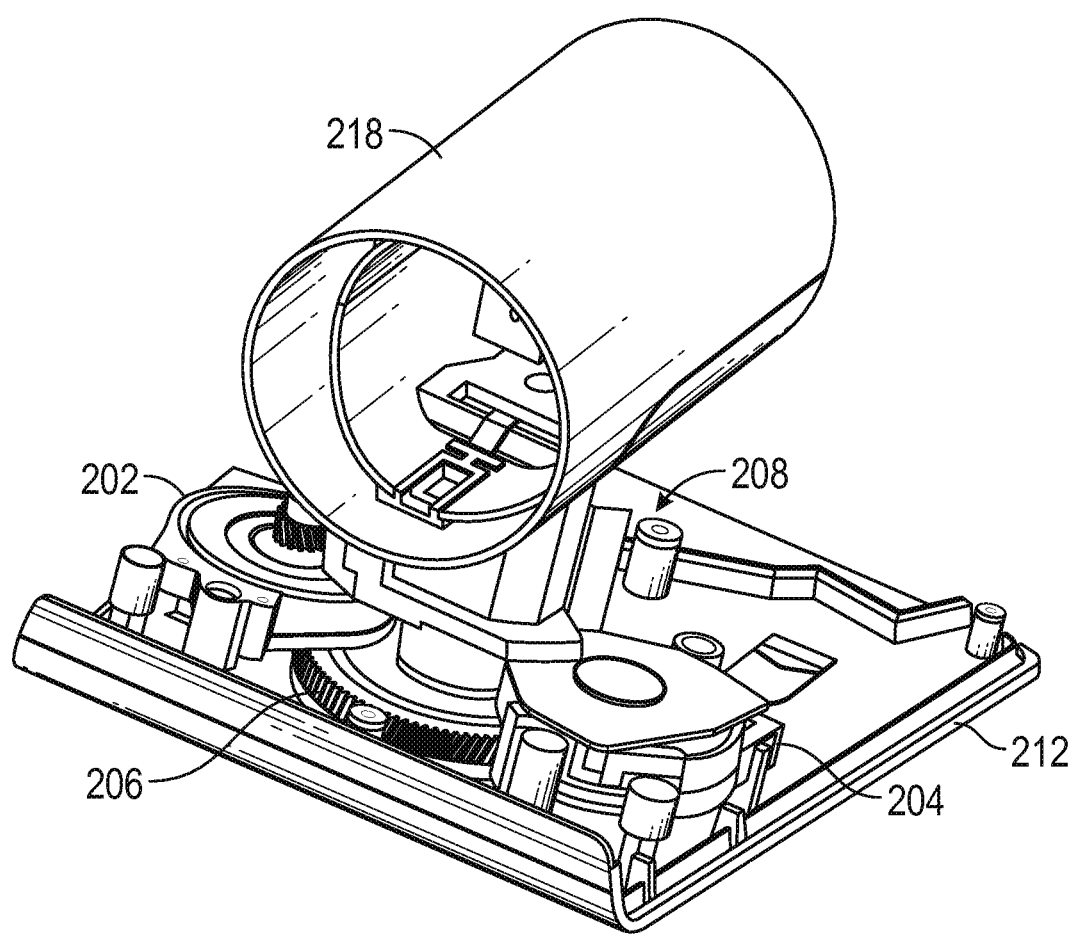
FIGS. 2A and 2B show a pan-tilt mechanism.
Figure 2B:
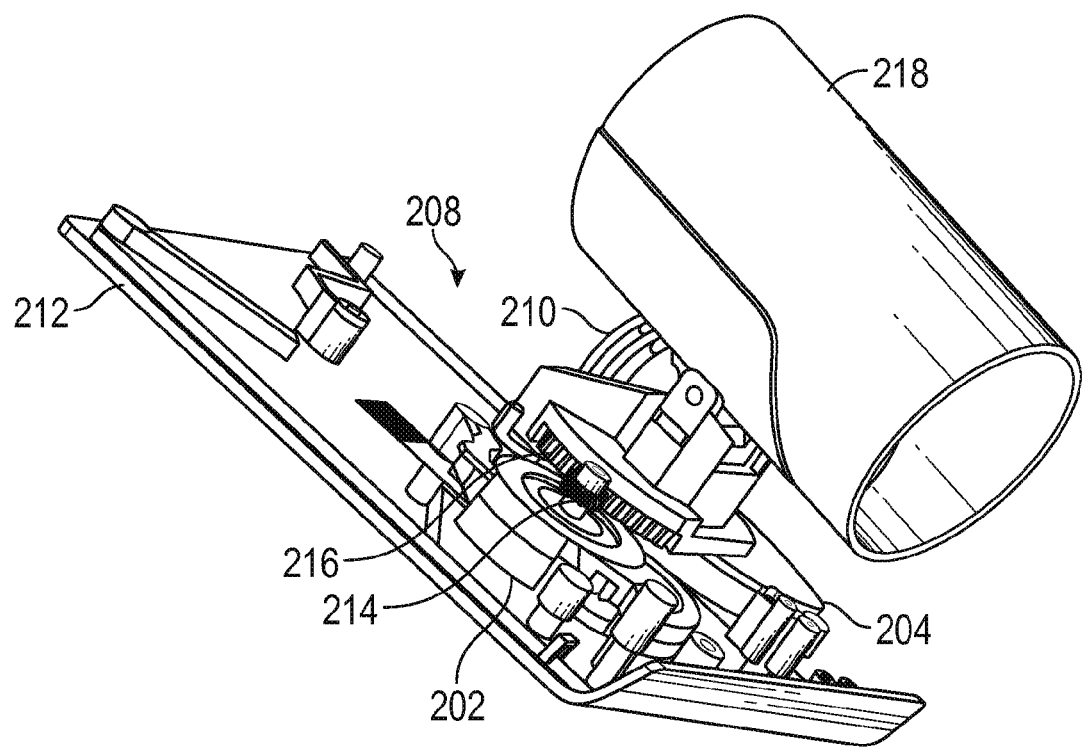

FIGS. 2A and 2B show pan-tilt mechanism 102. Pan-tilt mechanism 102 may comprise a pan motor 202, a tilt motor 204, a spur gear 206, a tilt assembly 208, a tilt arm 210, and a base 212. Pan motor 202 and tilt motor 204 may be attached (e.g. affixed) to base 212. Because pan motor 202 and tilt motor 204 may be attached to base 212, neither may move nor ride on any portion of pan-tilt mechanism 102 during operation. Consequently, electrical wires connected to pan motor 202 and tilt motor 204 may not be damaged due to flexing since neither pan motor 202 and tilt motor 204 may move during operation of pan-tilt mechanism 102. Moreover, neither pan motor 202 nor tilt motor 204 may have to be sized to move the weight of the other respective motor since neither may ride on any portion of pan-tilt mechanism 102 during operation. A pan gear 214 may be connected to pan motor 202 and mesh with a geared section 216 that may be located on tilt assembly 208. A housing 218 (e.g., a lens housing or camera housing) may be attached to tilt assembly 208. Video conferencing camera 104 may be located within housing 218 or may be connected directly to pan-tilt mechanism 102.

Figure 3:
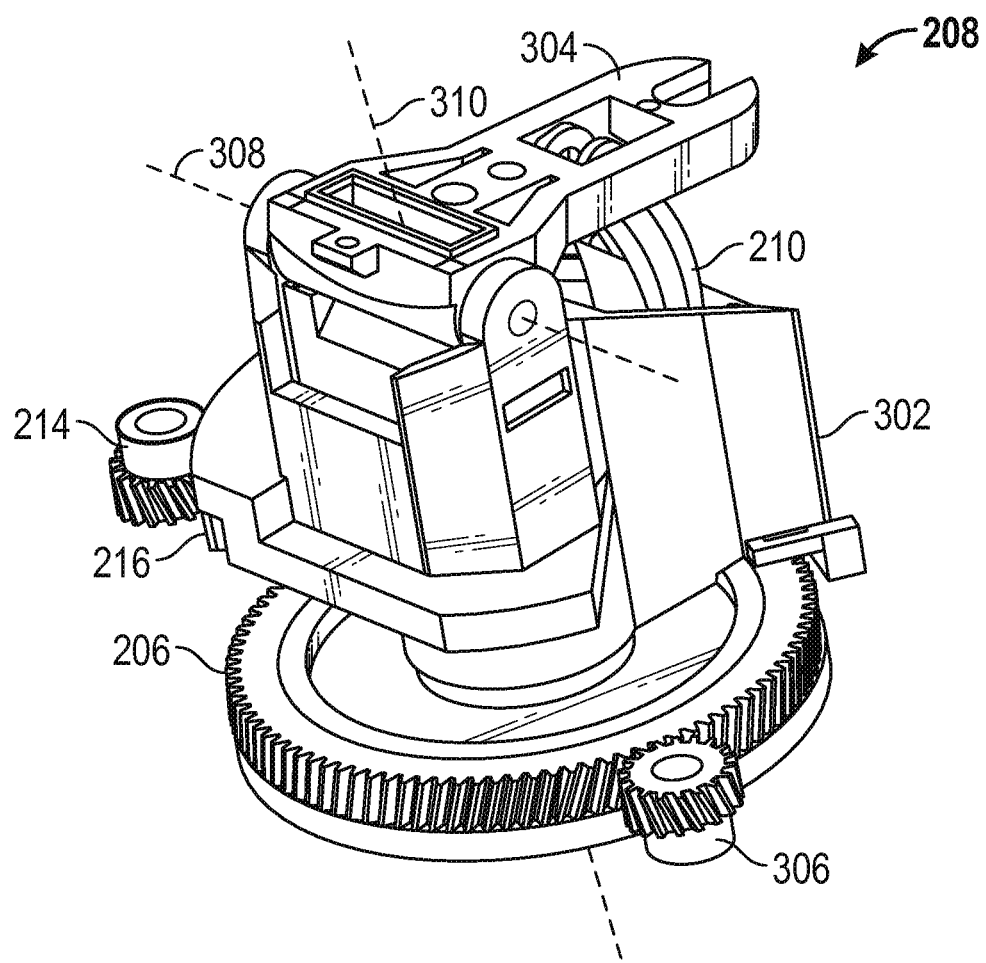
FIG. 3 shows a tilt assembly.
Figure 4:
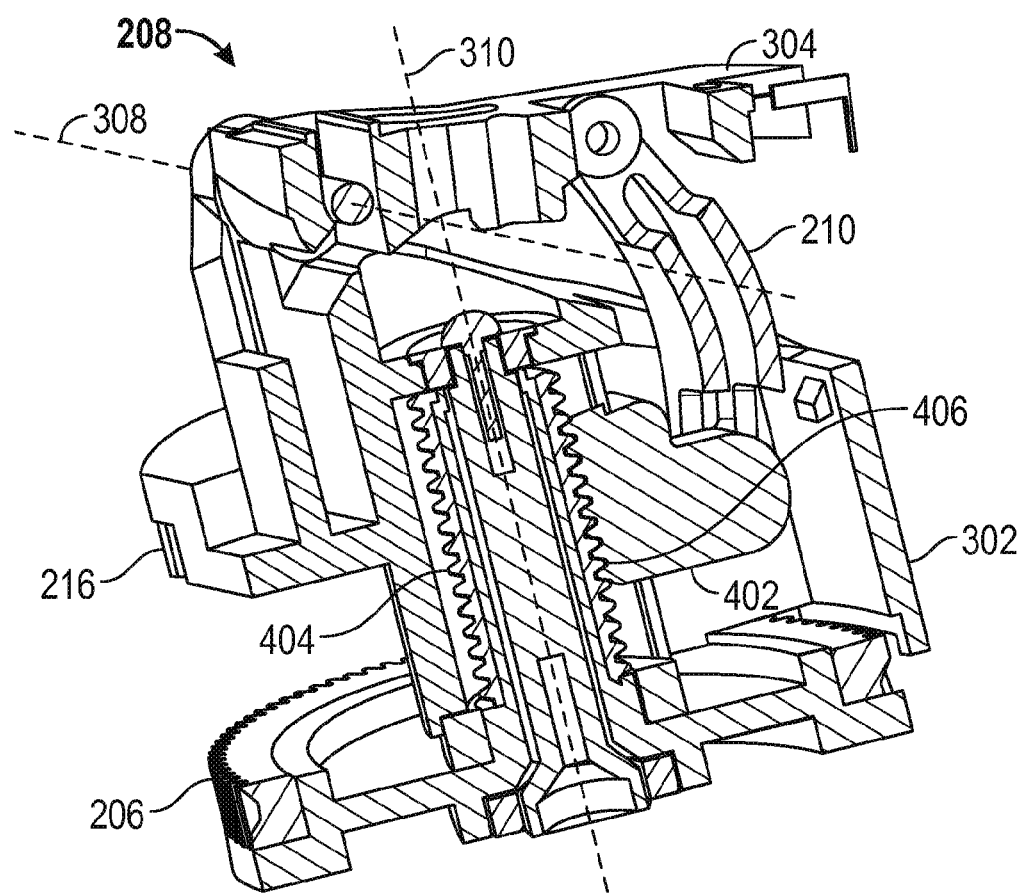
FIG. 4 shows a cross-section of a tilt assembly.

FIG. 3 shows tilt assembly 208 and FIG. 4 shows a cross-section of tilt assembly 208. Tilt assembly 208 may comprise spur gear 206, tilt arm 210, a tilt body 302, a bracket 304, and a lift nut 402. A tilt gear 306 may connect tilt motor 204 to spur gear 206.

As shown in FIG. 4, spur gear 206 may comprise a first threaded portion 404. Lift nut 402 may comprise a second threaded portion 406. First threaded portion 404 may mesh with second threaded portion 406.

Tilt motor 204 may turn tilt gear 306. As tilt gear 306 turns, lift nut 402 may traverse first threaded portion 404 up away from base 212 or down toward base 212, depending on the rotation direction of tilt motor 204. As lift nut 402 traverses first threaded portion 404, the linear motion of lift nut 402 may be transferred to bracket 304 via tilt arm 210. Stated another way, as lift nut 402 traverses first threaded portion 404, a force may be applied to tilt arm 210 and bracket 304. The transfer of linear motion or applied force may cause bracket 304 to rotate about a horizontal axis 308. The rotation of bracket 304 about horizontal axis 308 may cause housing 218 to tilt up or down.

Pan motor 202 may cause pan gear 214 to rotate. As pan gear 214 rotates, tilt body 302 may rotate about a vertical axis 310. In other words, as pan motor 202 rotates, tilt body 302 may pan left or right.

During use, a user may position video conferencing camera 104 at a desired tilt angle. For instance, bracket 304 may initially be parallel with base 212. The user may position video conferencing camera 104 such that bracket 304 is at a 45 degree angle to base 212. The user may then need to pan video conferencing camera 104 to the left or right.

During the tilting operation, tilt motor 204 may be the only motor that is actuated. During the panning operation, however, both the tilt motor 204 and the pan motor 202 may need to be actuated. This is because if only pan motor 202 is actuated during a pan operation, not only will video conferencing camera 104 pan, it may inadvertently tilt as well. For example, if only pan motor 202 is actuated during a panning operation, tilt body 302 may rotate around spur gear 206, which may be stationary. The rotation of tilt body 302 around a spur gear 206, which may be stationary, may cause lift nut 402 to traverse second thread portion 406 as described above and cause an inadvertently tilt during the panning operation.

As a result, during a panning operation, it may be necessary to actuate both pan motor 202 and tilt motor 204. In other words, to pan tilt body 302 about vertical axis 310 while maintaining housing 218 in a fixed tilt position, tilt motor 204 may be actuated in conjunction with pan motor 202. To maintain the fixed tilt position, spur gear 206 may need to be rotated at the same speed and direction as tilt body 302. In other words, spur gear 206's rotational speed and tilt body 302's rotational speed may need to be synchronized to maintain the fixed tilt position. Factors that may affect synchronization may include, for example, the gear ratio of tilt gear 306 to spur gear 206, the gear ratio of pan gear 214 to geared section 216, the radius of spur gear 206 and the radius of geared section 216, the speeds of pan motor 202, and tilt motor 204.

Figure 5:
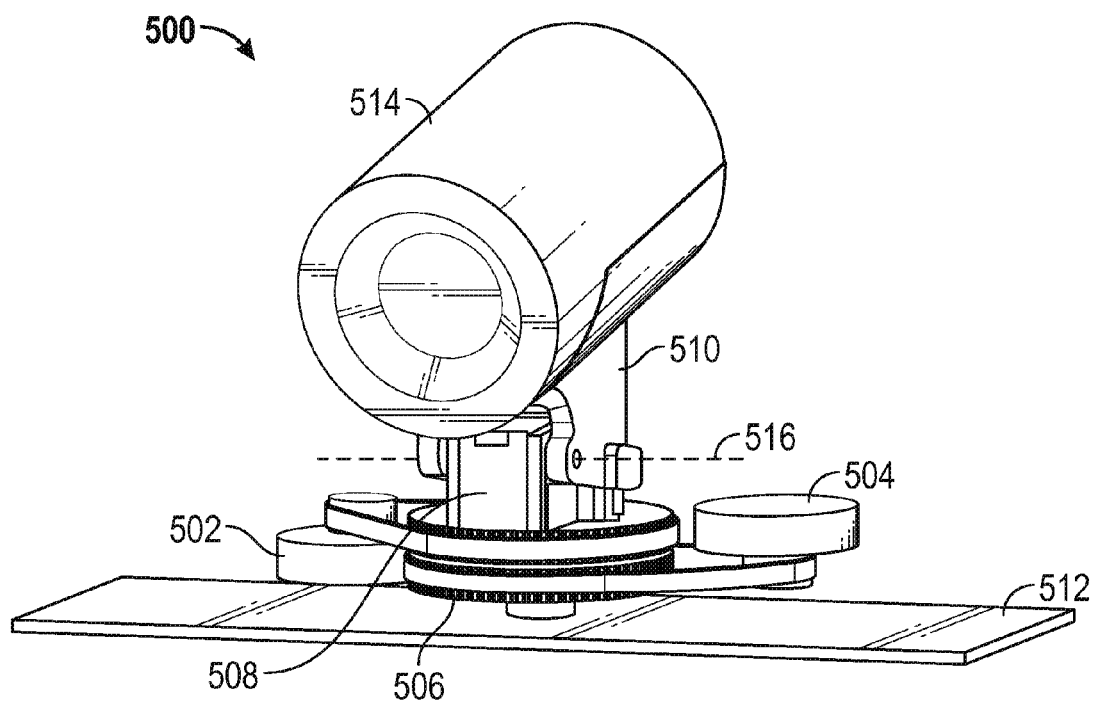
FIG. 5 shows a pan-tilt mechanism.
Figure 6:
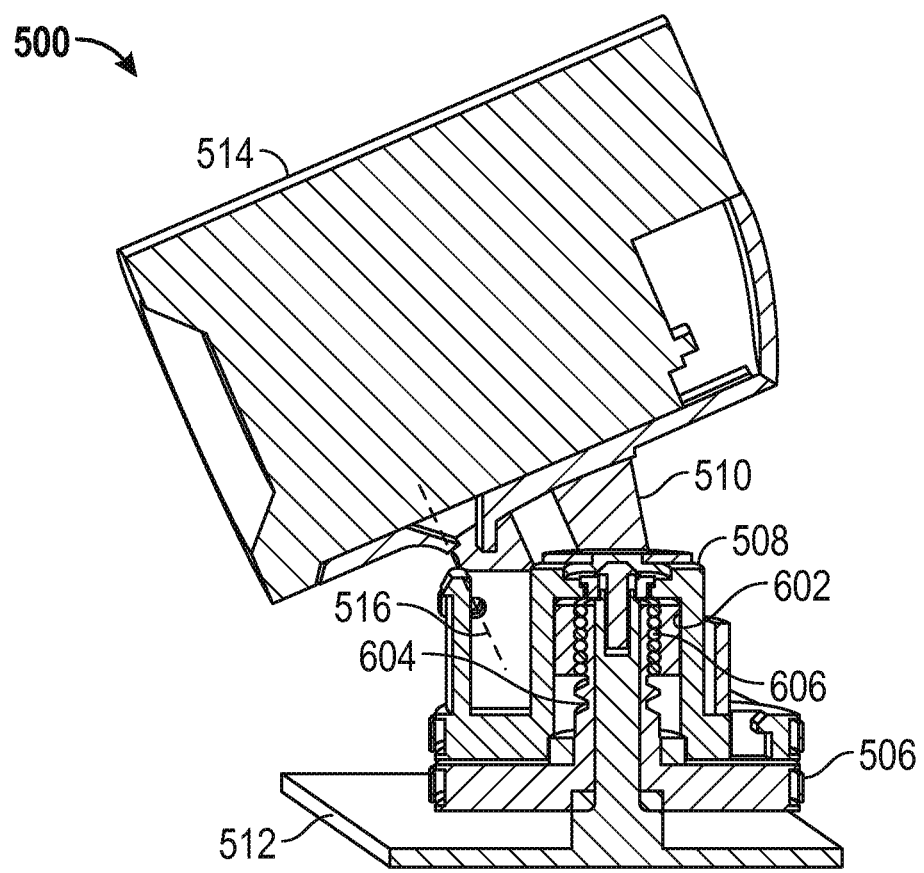
FIG. 6 shows a cross-section of a pan-tilt mechanism.

FIG. 5 shows a pan-tilt mechanism 500 and FIG. 6 shows a cross-section of pan-tilt mechanism 500. Pan-tilt mechanism 500 may comprise a pan motor 502, a tilt motor 504, a spur gear 506, a tilt body 508, a bracket 510, a base 512, a housing 514, and a lift nut 602. Pan motor 502, tilt motor 504, spur gear 506, and tilt body 508 may be affixed to base 512. Bracket 510 may be connected to tilt body 508 at a pivot axis 516 and to lift nut 602. Housing 514 may be connected to bracket 510.

During operation, tilt motor 504 may cause spur gear 506 to rotate. During the rotation, a first threaded portion 604 located on spur gear 506 may engage a second threaded portion 606 located on lift nut 602. When spur gear 506 rotates, lift nut 602 may traverse up away from base 512 or down toward base 512. As lift nut 602 traverses up or down, lift nut 602 may apply a force to bracket 510. The applied force may cause bracket 510 to tilt about pivot axis 516.

Because pan motor 502 and tilt motor 504 may be attached to base 512, neither may move nor ride on any portion of pan-tilt mechanism 500 during operation. Consequently, electrical wires connected to pan motor 502 and tilt motor 504 may not be damaged due to flexing since neither pan motor 502 and tilt motor 504 may move during operation of pan-tilt mechanism 500. Moreover, neither pan motor 502 nor tilt motor 504 may have to be sized to move the weight of the other respective motor since neither may ride on any portion of pan-tilt mechanism 500 during operation.

Pan motor 502 may cause tilt body 508 to rotate. Pan motor 502 may be linked to tilt body 508 directly with gears as described above or with a belt or chain as shown in FIG. 5. As pan motor 502 rotates, tilt body 508 may rotate about a vertical axis. In other words, as pan motor 502 rotates, tilt body 508 may pan left or right.

During use, a user may position video conferencing camera 104 at a desired tilt angle. For instance, bracket 510 may initially be parallel with base 512. The user may position video conferencing camera 104 such that bracket 510 is at a 30 degree angle to base 512. The user may then need to pan video conferencing camera 104 to the left or right.

During the tilting operation tilt motor 504 may be the only motor that is actuated. During the panning operation both the tilt motor 504 and the pan motor 502 may need to be actuated. For example, if only pan motor 502 is actuated, tilt body 508 may rotate around spur gear 506, which may be held stationary by pan motor 502. The rotation of tilt body 508 around a stationary spur gear 506 may cause lift nut 602 to traverse second thread portion 606 as described above. Consequently, if only pan motor 502 is actuated during a pan operation, not only may housing 514 pan, it may inadvertently tilt as well.

As a result, during a panning operation, it may be necessary to actuate both pan motor 502 and tilt motor 504 to maintain a desired tilt. In other words, to pan tilt body 508 about a vertical axis while maintaining housing 514 in a fixed tilt position, tilt motor 504 may be actuated in conjunction with pan motor 502. To maintain the fixed tilt position, spur gear 506 may need to be rotated at the same speed and direction as tilt body 508. In other words, spur gear 506's rotational speed and tilt body 508's rotational speed may need to be synchronized to maintain the fixed tilt position. Factors that may affect synchronization may include, for example, the gear ratio of tilt motor 504's drive gear to spur gear 506, the gear ratio of pan motor 502's drive gear to tilt body 508's driven gear, the radius of spur gear 506 and the radius of tilt body 508, the speeds of pan motor 502, and tilt motor 504.

Figure 7:
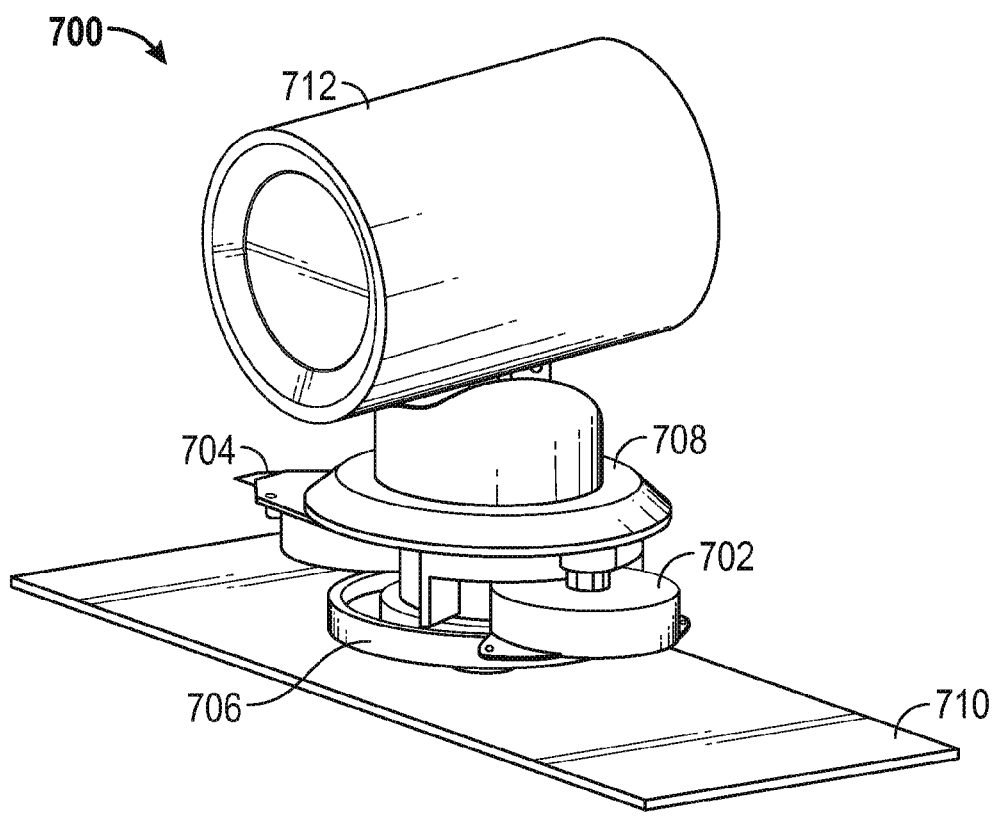
FIG. 7 shows a pan-tilt mechanism.
Figure 8:
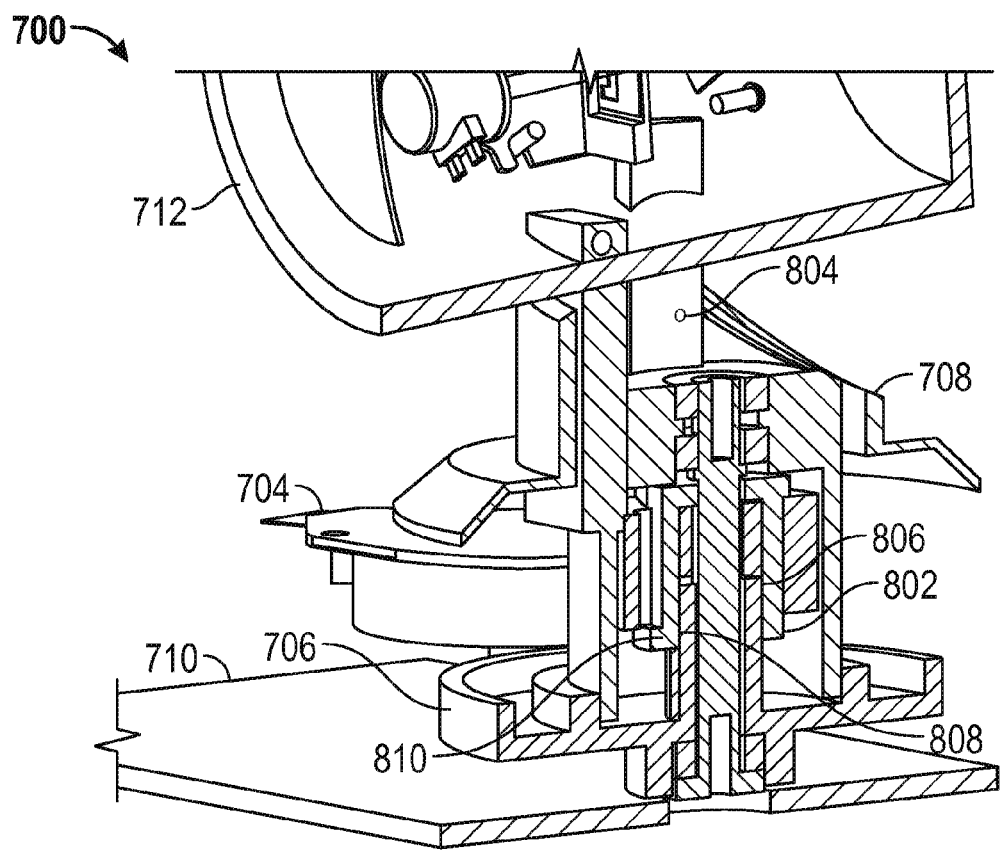
FIG. 8 shows a cross-section of a pan-tilt mechanism.

FIG. 7 shows a pan-tilt mechanism 700 and FIG. 8 shows a cross-section of pan-tilt mechanism 700. Pan-tilt mechanism 700 may comprise a pan motor 702, a tilt motor 704, a spur gear 706, a tilt body 708, a base 710, a housing 712, a lift nut 802, and a lift arm 804. Pan motor 702, tilt motor 704, and spur gear 706 may be afixed to base 710. Housing 712 may be connected to tilt body 708.

During operation, tilt motor 704 may cause spur gear 706 to rotate. During the rotation, a first threaded portion 806 located on spur gear 706 may engage a second threaded portion 808 located on lift nut 802. When spur gear 706 rotates, lift nut 802 may traverse up away from base 710 or down toward base 710. Lift arm 804 may rest on a ledge 810. Thus, as lift nut 802 traverses up or down, lift nut 802 may apply a force to lift arm 804. The applied force may cause bracket housing 712 to tilt about a pivot axis.

Pan motor 702 may cause tilt body 708 to rotate. Pan motor 702 may be linked to tilt body 708 directly with gears or with a belt or chain as described above. As pan motor 702 rotates, tilt body 708 may rotate about a vertical axis. In other words, as pan motor 702 rotates, tilt body 708 may pan left or right. Because pan motor 702 and tilt motor 704 may be attached to base 710, neither may move nor ride on any portion of pan-tilt mechanism 700 during operation. Consequently, electrical wires connected to pan motor 702 and tilt motor 704 may not be damaged due to flexing since neither pan motor 702 and tilt motor 704 may move during operation of pan-tilt mechanism 700. Moreover, neither pan motor 702 nor tilt motor 704 may have to be sized to move the weight of the other respective motor since neither may ride on any portion of pan-tilt mechanism 700 during operation.

During use, a user may position video conferencing camera 104 at a desired tilt angle. For instance, housing 712 may initially be parallel with base 710. The user may position video conferencing camera 104 such that housing 712 is at a 30 degree angle to base 710. The user may then need to pan video conferencing camera 104 to the left or right.

During the tilting operation, tilt motor 704 may be the only motor that is actuated. Because lift arm 804 rest freely on ledge 810, lift arm 804 may rotate about lift nut 802 without causing lift nut 802 to rotate. Thus, during the panning operation tilt motor 504 may not need to be actuated. For example, if only pan motor 702 is actuated, lift arm 804 may rotate around lift nut 802 without causing lift nut 802 to traverse first threaded portion 806. In other words, because lift nut 802 is separated from tilt body 708, spur gear 706's rotational speed and tilt body 708's rotational speed may not need to be synchronized to maintain the fixed tilt position.

Figure 9:
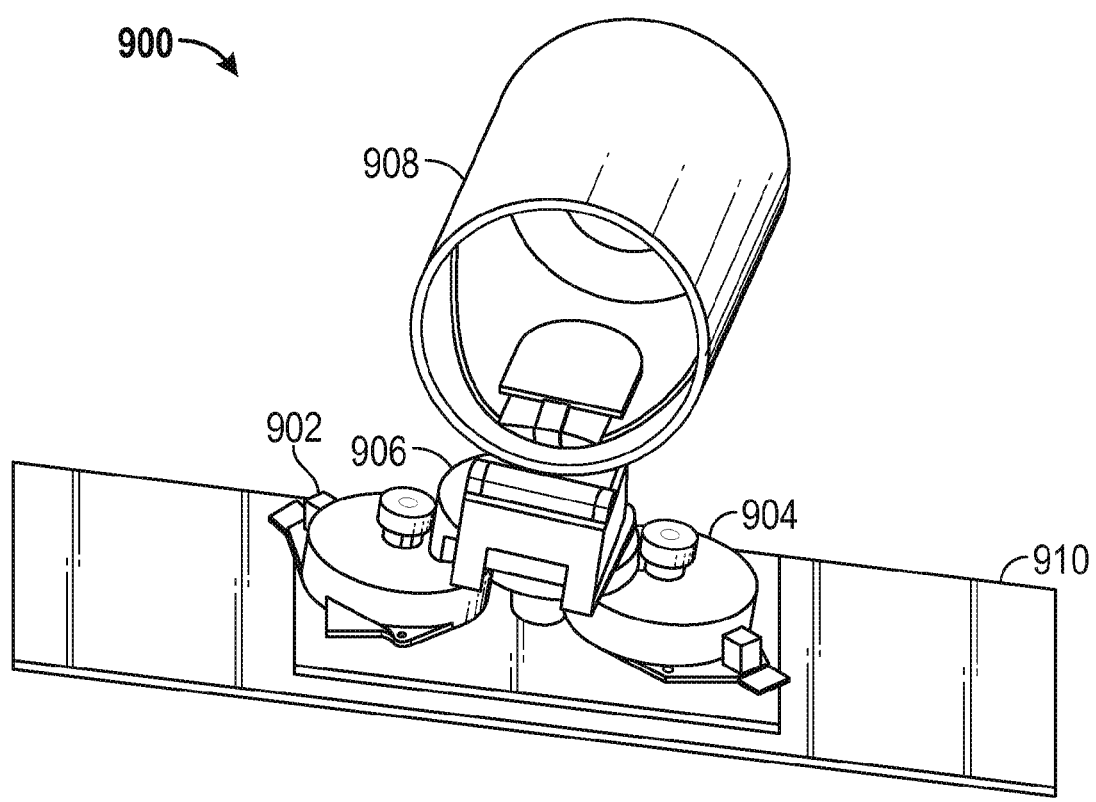
FIG. 9 shows a pan-tilt mechanism.
Figure 10:
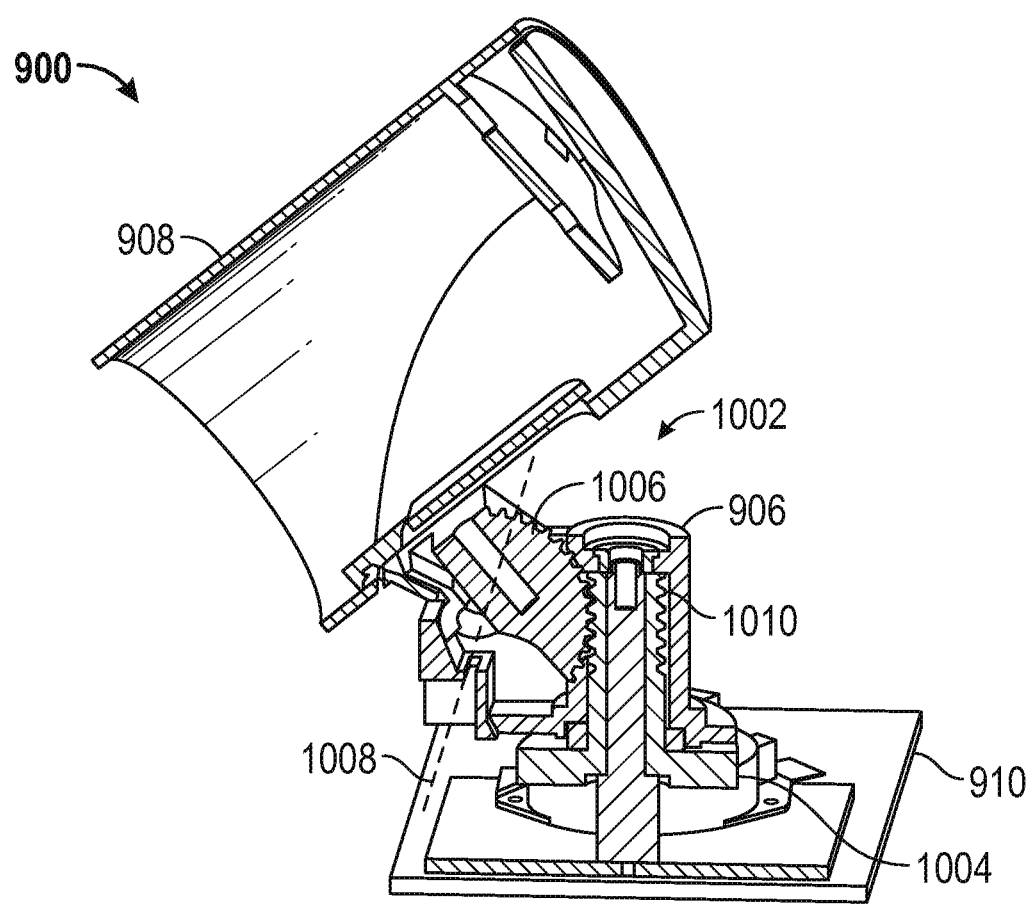
FIG. 10 shows a cross-section of a pan-tilt mechanism.

FIG. 9 shows a pan-tilt mechanism 900 and FIG. 10 shows a cross-section of pan-tilt mechanism 900. Pan-tilt mechanism 900 may comprise a pan motor 902, a tilt motor 904, a tilt body 906, a housing 908, a base 910, and a worm gear 1004. Bracket 1002 may comprise a bracket gear 1006 and a pivot axis 1008. Pan motor 902, tilt motor 904, and worm gear 1004 may be connected to base 910. Tilt body 906 may include a bracket 1002. Tilt body 906 and bracket 1002 may form a single structure where bracket 1002 pivots about a pivot axis 1008.

Pan motor 902 may be operatively connected to bracket 1002 such that tilt body 906 may rotate about a vertical axis. Because pan motor 902 and tilt motor 904 may be attached to base 910, neither may move nor ride on any portion of pan-tilt mechanism 900 during operation. Consequently, electrical wires connected to pan motor 902 and tilt motor 904 may not be damaged due to flexing since neither pan motor 902 and tilt motor 904 may move during operation of pan-tilt mechanism 900. Moreover, neither pan motor 902 nor tilt motor 904 may have to be sized to move the weight of the other respective motor since neither may ride on any portion of pan-tilt mechanism 900 during operation. For example, pan motor 902 may be connected to tilt body 906, which may be connected to bracket 1002, such that when tilt body 906 rotates about the vertical axis, bracket 1002 also rotates about the vertical axis.

Worm gear 1004 may be connected to tilt motor 904 and bracket gear 1006. Rotation of worm gear 1004 may cause bracket gear 1006 to rotate, which in turn may cause bracket 1002 to rotate about pivot axis 1008. Bracket 1002 may rotate about vertical axis such that bracket 1002 rotating about the vertical axis and not rotating about pivot axis 1008. Bracket 1002 may be connected to tilt body 906 at pivot axis 1008. Worm gear 1004 may be at least partially enclosed within tilt body 906.

For example, during operation, tilt motor 904 may cause worm gear to rotate. During the rotation, a threaded portion 1010 located on worm gear 1004 may engage bracket gear 1006 located on bracket 1002. When worm gear 1004 rotates, bracket 1002 may rotate about pivot axis 1008. As bracket 1002 rotates, housing 908 may tilt up or down.

Pan motor 902 may cause tilt body 906 to rotate. Pan motor 902 may be linked to tilt body 906 directly with gears or with a belt or chain as described above. As pan motor 902 rotates, tilt body 906 may rotate about a vertical axis. In other words, as pan motor 902 rotates, tilt body 906 may pan left or right.

During use, a user may position video conferencing camera 104 at a desired tilt angle. For instance, housing 908 may initially be parallel with base 910. The user may position video conferencing camera 104 such that housing 908 is at a 30 degree angle to base 910. The user may then need to pan video conferencing camera 104 to the left or right.

During the tilting operation, tilt motor 904 may be the only motor that is actuated. During the panning operation both tilt motor 904 and pan motor 902 may need to be actuated. For example, if only pan motor 902 is actuated, tilt body 906 may rotate around worm gear 1004, which may be held stationary by pan motor 902. The rotation of tilt body 906 around a stationary worm gear 1004 may cause bracket 1002 as described above.

As a result, during a panning operation, it may be necessary to actuate both pan motor 902 and tilt motor 904. In other words, to pan tilt body 906 about the vertical axis while maintaining housing 908 in a fixed tilt position, tilt motor 904 may be actuated in conjunction with pan motor 902. To maintain the fixed tilt position, worm gear 1004 may need to be rotated at the same speed and direction as tilt body 906. In other words, worm gear 1004's rotational speed and tilt body 906's rotational speed may need to be synchronized to maintain the fixed tilt position. Factors that may affect synchronization may include, for example, the gear ratio of tilt motor 504's drive gear to worm gear 1004, the gear ratio of pan motor 902's drive gear to bracket gear 1006, the radius of worm gear 1004 and the radius of bracket gear 1006, the speeds of pan motor 902, and tilt motor 904.

Figure 11:
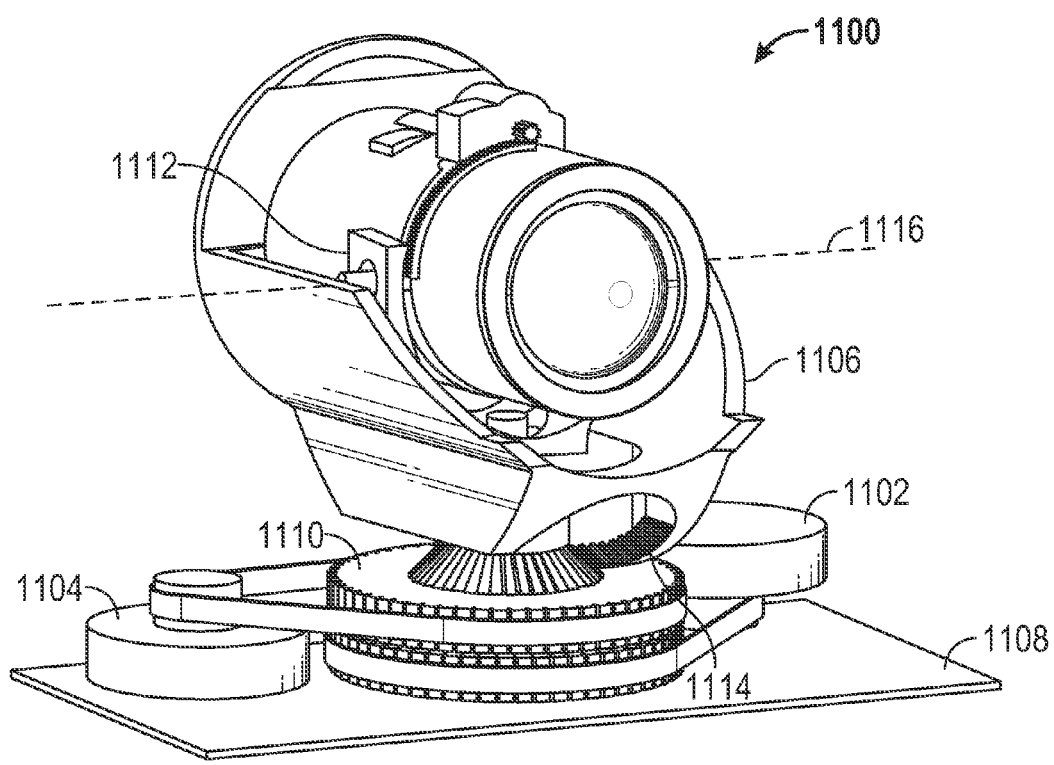
FIG. 11 shows a pan-tilt mechanism.

FIG. 11 shows a pan-tilt mechanism 1100. Pan-tilt mechanism 1100 may comprise a pan motor 1102, a tilt motor 1104, a housing 1106, a base 1108, a gear or wheel 1110 (hereinafter referred to as gear 1110), and a pan bracket 1112. Pan motor 1102, tilt motor 1104, and gear 1110 may be connected to base 1108.

Tilt motor 1104 may be connected to gear 1110. Gear 1110 may be connected to housing 1106 via a housing gear 1114. When gear 1110 rotates, housing 1106 may rotate about a horizontal axis 1116. Pan motor 1102 may be operatively connected to pan bracket 1112 such that pan motor 1102 may rotate pan bracket 1112 about a vertical axis.

Gear 1110 may be connected to tilt motor 1104 and housing gear 1114. Rotation of gear 1110 may cause housing 1106 to tilt. For example, during operation, tilt motor 1104 may cause gear 1110 to rotate. During the rotation, worm gear may engage housing gear 1114 causing housing 1106 to tilt about horizontal axis 1116.

Pan motor 1102 may cause pan bracket 1112 to rotate, which in turn may cause housing 1106 to rotate. Pan motor 1102 may be linked to pan bracket 1112 directly with gears or with a belt or chain as described above. As pan motor 1102 rotates, pan bracket 1112 may rotate about a vertical axis causing housing 1106 to rotate about the vertical axis. Because pan motor 1102 and tilt motor 1104 may be attached to base 1108, neither may move nor ride on any portion of pan-tilt mechanism 1100 during operation. Consequently, electrical wires connected to pan motor 1102 and tilt motor 1104 may not be damaged due to flexing since neither pan motor 1102 nor tilt motor 1104 may move during operation of pan-tilt mechanism 1100. Moreover, neither pan motor 1102 nor tilt motor 1104 may have to be sized to move the weight of the other respective motor since neither may ride on any portion of pan-tilt mechanism 1100 during operation.

During use, a user may position video conferencing camera 104 at a desired tilt angle. For instance, housing 1106 may initially be parallel with base 1108. The user may position video conferencing camera 104 such that housing 1106 is at a 30 degree angle to base 1108. The user may then need to pan video conferencing camera 104 to the left or right.

During the tilting operation, tilt motor 1104 may be the only motor that is actuated. During the panning operation both tilt motor 1104 and pan motor 1102 may need to be actuated. For example, if only pan motor 1102 is actuated, housing 1106 and housing gear 1114 may rotate around gear 1110, which may be held stationary by pan motor 1102. The rotation of housing gear 1114 around a stationary gear 1110 may cause housing 1106 to tilt up or down.

As a result, during a panning operation, it may be necessary to actuate both pan motor 1102 and tilt motor 1104. In other words, to pan housing 1106 about the vertical axis while maintaining housing 1106 in a fixed tilt position, tilt motor 1104 may be actuated in conjunction with pan motor 1102. To maintain the fixed tilt position, gear 1110 may need to be rotated at the same speed and direction as housing 1106. In other words, gear 1110's rotational speed and housing 1106's rotational speed may need to be synchronized to maintain the fixed tilt position.

Figure 12:
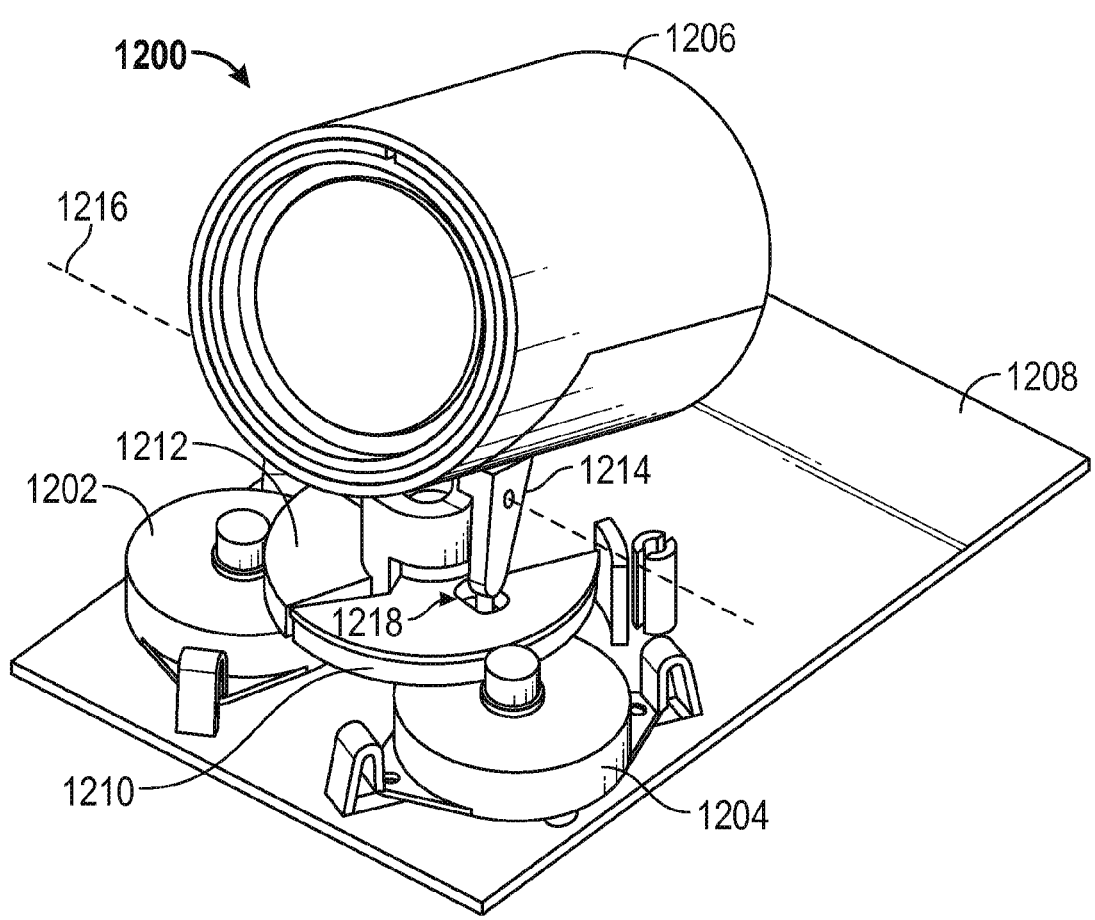
FIG. 12 shows a pan-tilt mechanism.
Figure 13:
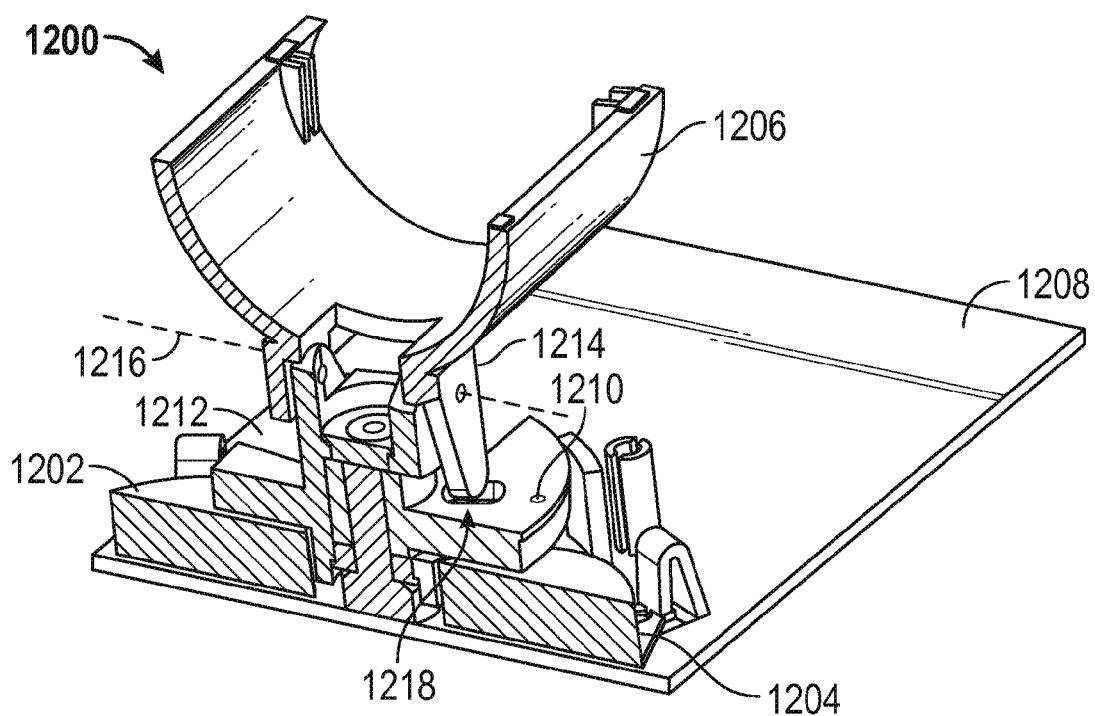
FIG. 13 shows a cross-section of a pan-tilt mechanism.

FIG. 12 shows a pan-tilt mechanism 1200 and FIG. 13 shows a cross-section of pan-tilt mechanism 1200. Pan-tilt mechanism 1200 may comprise a pan motor 1202, a tilt motor 1204, a housing 1206, a base 1208, a spur gear 1210, a pan base 1212, and a force arm 1214.

Tilt motor 1204 may be connected to spur gear 1210. Spur gear 1210 may be connected to housing 1206 via force arm 1214. When spur gear 1210 rotates, housing 1206 may rotate about a horizontal axis 1216. Pan motor 1202 may be operatively connected to pan base 1212 such that pan motor 1202 may rotate pan base 1212 about a vertical axis.

Spur gear 1210 may be connected to tilt motor 1204 and force arm 1214. Rotation of spur gear 1210 may cause force arm 1214 to apply a force to housing 1206, thus causing housing 1206 to tilt. For example, during operation, tilt motor 1204 may cause spur gear 1210 to rotate. During the rotation, spur gear 1210 may engage force arm 1214 causing housing 1106 to tilt about horizontal axis 1216. Force arm 1214 may pivot about a pivot point 1218.

Pan motor 1202 may cause pan base 1212 to rotate, which in turn may cause housing 1206 to rotate. Pan motor 1202 may be linked to pan base 1212 directly with gears or with a belt or chain as described above. As pan motor 1202 rotates, pan base 1212 may rotate about a vertical axis causing housing 1206 to rotate about the vertical axis. Because pan motor 1202 and tilt motor 1204 may be attached to base 1208, neither may move nor ride on any portion of pan-tilt mechanism 1200 during operation. Consequently, electrical wires connected to pan motor 1202 and tilt motor 1204 may not be damaged due to flexing since neither pan motor 1202 and tilt motor 1204 may move during operation of pan-tilt mechanism 1200. Moreover, neither pan motor 1202 nor tilt motor 1204 may have to be sized to move the weight of the other respective motor since neither may ride on any portion of pan-tilt mechanism 1200 during operation.

During use, a user may position video conferencing camera 104 at a desired tilt angle. For instance, housing 1206 may initially be parallel with base 1208. The user may position video conferencing camera 104 such that housing 1206 is at a 30 degree angle to base 1208. The user may then need to pan video conferencing camera 104 to the left or right.

During the tilting operation, tilt motor 1204 may be the only motor that is actuated. During the panning operation both tilt motor 1204 and pan motor 1202 may need to be actuated. For example, if only pan motor 1202 is actuated, housing 1206 and pan base 1212 may rotate while spur gear 1210 is held stationary by tilt motor 1204. The rotation of pan base 1212 in conjunction with a stationary spur gear 1210 may cause housing 1206 to tilt up or down.

As a result, during a panning operation, it may be necessary to actuate both pan motor 1202 and tilt motor 1204. In other words, to pan housing 1206 about the vertical axis while maintaining housing 1206 in a fixed tilt position, tilt motor 1204 may be actuated in conjunction with pan motor 1202. To maintain the fixed tilt position, spur gear 1210 may need to be rotated at the same speed and direction as pan base 1212. In other words, spur gear 1210's rotational speed and pan base 1212's rotational speed may need to be synchronized to maintain the fixed tilt position.

Figure 14:
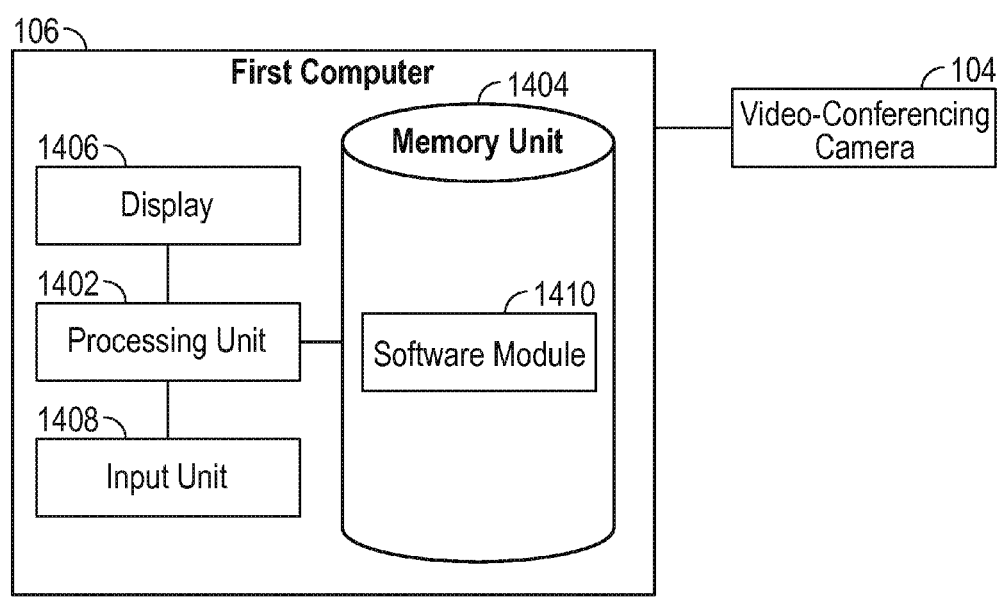
FIG. 14 shows a computer.

Panning and tilting video conferencing camera 104 may be accomplished by an application running on first computer 106 (e.g. the computing device), shown in FIG. 14. As shown in FIG. 14, first computer 106 may include a processing unit 1402, a memory unit 1404, a display 1406, and an input unit 1408. Memory unit 1404 may include a software module 1410. While executing on processing unit 1402, software module 1410 may perform processes for panning and tilting video conferencing camera 104, including, for example, one or more stages included in method 1500 described below with respect to FIG. 15.

First computer 106 ("the processor") may be implemented using a personal computer, a network computer, a mainframe, a smartphone, or other similar computer-based system. First computer 106 may also be configured to transmit data to video conferencing camera 104.

The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise a mobile terminal, such as a smart phone, a cellular telephone, a cellular telephone utilizing wireless application protocol (WAP), personal digital assistant (PDA), intelligent pager, portable computer, a hand held computer, or a wireless fidelity (Wi-Fi) access point. The aforementioned systems and devices are examples and the processor may comprise other systems or devices.

Figure 15:
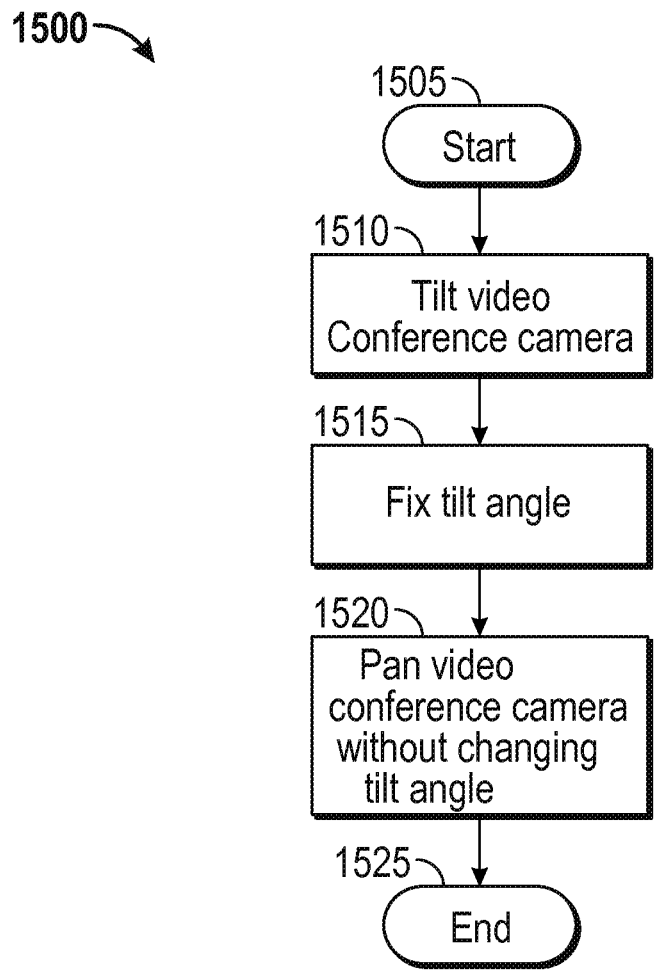
FIG. 15 shows a flow chart for a method for panning and tilting a video conferencing camera.

FIG. 15 is a flow chart setting forth the general stages involved in method 1500 for panning and tilting video conferencing camera 104. Method 1500 may be implemented using, for example, first computer 106 as described in more detail above. Ways to implement the stages of method 1500 will be described in greater detail below.

Method 1500 may begin at starting block 1505 and proceed to stage 1510 where first computer 106 may cause video conferencing camera 104 to tilt about a horizontal axis. For example, as described above, tilt motor 204 may cause lift nut 402 to apply a force to bracket 304. The applied force may cause bracket 304 to tilt about horizontal axis 308. Because video conferencing camera 104 may be attached to bracket 304, video conferencing camera 104 may tilt about horizontal axis 308 along with bracket 304.

From stage 1510 where video conferencing camera 102 was tilted about the horizontal axis, method 1500 may advance to stage 1515 where a tilt angle about the horizontal axis may be fixed. For example, as video conferencing camera 102 is being tilted about the horizontal axis, a user may press a button on first computer 106 that may terminate actuation of tilt motor 204, thus fixing the tilt angle. Furthermore, as described above, the tilt angle may be fixed by fixing the position of lift nut 402 in a vertical position.

From stage 1515 where the tilt angle is fixed, method 1500 may proceed to stage 1520 where first computer 106 may cause video conferencing camera 104 to pan about a vertical axis without changing the tilt angle. For example, as described above, first computer 106 may actuate pan motor 202 and tilt motor 204 simultaneously. The simultaneous actuation of pan motor 202 and tilt motor 204 may cause video conferencing camera 104 to pan about the vertical axis without changing the tilt angle. Furthermore, as described above, video conferencing camera 104 may pan about the vertical axis without changing the tilt angle by synchronizing the rotation of lift nut 402 and tilt body 302 about vertical axis 310. Moreover, video conferencing camera 104 may pan about vertical axis 310 by causing lift nut 402 to maintain a fixed vertical position. From stage 1520, where first computer 106 caused video conferencing camera 104 to pan without changing the tilt angle, method 1500 may end at stage 1525.

Consistent with embodiments, a pan-tilt mechanism for a video conferencing camera may be provided. The pan-tilt mechanism may comprise a base, a bracket, a tilt motor, and a pan motor. The tilt motor may be fixed to the base and may be configured to cause the bracket to tilt along a horizontal axis. The pan motor may be fixed to the base and may be configured to cause the bracket to pan about a vertical axis. The pan motor may be configured to actuate in conjunction with the tilt motor.

The pan-tilt mechanism may further comprise a lift nut and a tilt arm. The lift nut may be operatively connected to the tilt motor. In addition, the lift nut may be operatively connected to the tilt motor and the bracket. The tilt arm may be operatively connected to the housing and the gear lift nut. Movement of the lift nut may cause the gear lift arm to apply a force to the bracket. The force may be operative to cause the bracket to tilt along the horizontal axis.

The pan-tilt mechanism may further comprise a pan spur operatively connected to the pan motor and the bracket. Rotation of the pan spur may cause the bracket to rotate about the vertical axis. A lens housing may be connected to the bracket. A camera may be connected to the bracket.

Consistent with embodiments, a pan-tilt mechanism for a video conferencing camera may be provided. The pan-tilt mechanism may comprise a bracket and a worm gear. The bracket may comprise a bracket gear comprising a pivot axis. The bracket may be operatively connected to a pan motor and configured to rotate about a vertical axis. The worm gear may be connected to a tilt motor and the bracket gear. Rotation of the worm gear may cause the bracket gear to rotate and the bracket to rotate about the pivot axis. The bracket configured to rotate about the vertical axis may comprise the bracket rotating about the vertical axis and not rotating about the pivot axis.

The bracket may be connected to a tilt body at the pivot axis. The worm gear may be at least partially enclosed within the tilt body. The bracket rotating about the vertical axis and not rotating about the pivot axis may comprise the tilt motor and the pan motor being synchronized such that the bracket rotating about the vertical axis does not cause the bracket to rotate about the pivot axis. The bracket may be connected to a tilt body at the pivot axis. The tilt body may be configured to rotate about the vertical axis. The worm gear may be configured to rotate about the vertical axis. A camera may be connected to the bracket.

Consistent with embodiments, a method for panning and tilting a video conferencing camera may be provided. The method may comprise: causing a bracket to tilt about a horizontal axis; fixing a tilt angle about the horizontal axis; and causing the bracket to pan about a vertical axis without changing the tilt angle. Causing the bracket to pan about the vertical axis without changing the tilt angle may comprise actuating a pan motor and a tilt motor simultaneously. Causing the bracket to pan about the vertical axis without changing the tilt angle may comprise synchronizing the rotation of a lift nut and a body around a vertical axis.

Fixing the angle about the horizontal axis may comprise fixing a vertical position of a lift nut. The lift nut may be connected to the bracket. Causing the bracket to pan about the vertical axis without changing the tilt angle may comprise maintaining the vertical position of a lift nut.

Consistent with embodiments, a pan-tilt mechanism for a video conferencing camera may be provided. The pan-tilt mechanism may comprise a tilt motor, a pan motor, a bracket, a memory, and a processor. The bracket may be operatively connected to the tilt motor and the pan motor. The processor may be in electrical communication with the tilt motor and the pan motor. The processor may be configured to: output a first signal to the tilt motor and output a second signal to the pan motor. The first signal may be configured to cause the bracket to tilt about a horizontal axis to a tilt angle. The second signal may be configured to cause the bracket to pan about a vertical axis without changing the tilt angle.

The processor operative to output the first signal and output the second signal may comprise, the processor operative to output the first signal and the second signal simultaneously. Furthermore, the processor operative to output the first signal and output the second signal may comprise the processor operative to synchronize a tilt motor speed with a pan motor speed such that the tilt angle remains constant. The processor may be operative to: receive a video signal from the camera, and output the video signal to a display.

Embodiments, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a tilt motor fixed to a base and configured to cause a bracket to tilt along a horizontal axis; and
   a pan motor fixed to the base and configured to cause the bracket to pan about a vertical axis and to cause a bracket to tilt along the horizontal axis.

2. The apparatus of claim 1, further comprising:
   a lift nut operatively fixed to the tilt motor; and
   a tilt arm operatively fixed to the lift nut, wherein movement of the lift nut causes the lift arm to apply a force to the bracket, the force operative to cause the bracket to tilt along the horizontal axis.

3. The apparatus of claim 1, further comprising a lift nut operatively fixed to the tilt motor and the bracket, wherein movement of the lift nut causes a force to be applied to the bracket, the force operative to cause the bracket to tilt along the horizontal axis.

4. The apparatus of claim 1, further comprising a pan gear operatively connected to the pan motor, wherein rotation of the pan gear causes the bracket to rotate about the vertical axis.

5. The apparatus of claim 1, further comprising a lens housing connected to the bracket.

6. The apparatus of claim 1, further comprising a camera connected to the bracket.

7. An apparatus comprising:
   a tilt motor fixed to a base;
   a pan motor fixed to the base;
   a bracket operatively connected to the tilt motor and the pan motor;
   a memory; and
   a processor in electrical communication with the tilt motor and the pan motor, the processor configured to:
   output a first signal to the tilt motor, the first signal configured to cause the bracket to tilt about a horizontal axis to a tilt angle, and
   output a second signal to the pan motor and a third signal to the tilt motor, the second signal and the third signal together being configured to cause the bracket to pan about a vertical axis and to simultaneously move a lift arm to maintain the tilt angle of the bracket.

8. The apparatus of claim 7, wherein the processor operative to output the first signal and output the second signal comprises, the processor operative to output the first signal and the second signal simultaneously.

9. The apparatus of claim 7, wherein the processor operative to output the first signal and output the second signal comprises, the processor operative to synchronize a tilt motor speed with a pan motor speed such that the tilt angle remains constant.

10. The apparatus of claim 7, further comprising a camera.

11. The apparatus of claim 10, further comprising the processor operative to:
    receive a video signal from the camera, and
    output the video signal to a display.

12. An apparatus comprising:
    a spur gear;
    a tilt body configured to rotate about a vertical axis passing through the spur gear, the vertical axis being substantially perpendicular to the spur gear;
    a bracket connected to the tilt body and being configured to tilt about a horizontal axis being substantially perpendicular to the vertical axis;

a tilt motor configured to, when the tilt body is held stationary, rotate the spur gear about the vertical axis causing the bracket to tilt about the horizontal axis; and a pan motor configured to, when the spur gear is held stationary, rotate the tilt body about the vertical axis and simultaneously causing the bracket to tilt about the horizontal axis, the tilt motor and the pan motor being fixed to a base.

13. The apparatus of claim 12, further comprising a lift nut operatively fixed to the tilt motor and the bracket, wherein movement of the lift nut causes a force to be applied to the bracket, the force operative to cause the bracket to tilt along the horizontal axis.

14. The apparatus of claim 12, the tilt body further comprising a geared section operatively connected to the pan motor.

15. The apparatus of claim 12, further comprising a lens housing connected to the bracket.

16. The apparatus of claim 12, further comprising a camera connected to the bracket.

17. A method comprising:
rotating, when a tilt body is held stationary, a spur gear about a vertical axis causing a bracket connected to the tilt body to tilt about a horizontal axis, the vertical axis being substantially perpendicular to the horizontal axis, the vertical axis being substantially perpendicular to the spur gear; and rotating, when the spur gear is held stationary, the tilt body about the vertical axis simultaneously causing the bracket to tilt about the horizontal axis.

18. The method of claim 17, wherein rotating the spur gear comprises rotating the spur gear using a tilt motor.

19. The method of claim 17, wherein rotating the tilt body comprises rotating the tilt body using a pan motor.

20. The method of claim 17, wherein rotating the spur gear comprises rotating the spur gear using a tilt motor and wherein rotating the tilt body comprises rotating the tilt body using a pan motor, the tilt motor and the pan motor being fixed to a base.

* * * * *